United States Patent
Pfaendner et al.

(10) Patent No.: US 6,706,824 B1
(45) Date of Patent: Mar. 16, 2004

(54) PROCESS FOR INCREASING THE MOLECULAR WEIGHT OF POLYCONDENSATES

(75) Inventors: Rudolf Pfaendner, Rimbach (DE); Kurt Hoffmann, Weitenau-Steinen (DE); Heinz Herbst, Lörrach (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 380 days.

(21) Appl. No.: 09/703,782

(22) Filed: Nov. 1, 2000

Related U.S. Application Data

(63) Continuation-in-part of application No. 09/125,178, filed as application No. PCT/EP97/00492 on Feb. 4, 1997, now abandoned.

(30) Foreign Application Priority Data

Feb. 15, 1996 (CH) .................................. 393/96

(51) Int. Cl.[7] .............................. C08G 63/91; C08J 3/00; C08L 67/00
(52) U.S. Cl. ..................... 525/437; 525/146; 525/165; 525/178; 525/340; 525/341; 525/377; 525/420; 525/423; 525/438; 525/449; 525/462; 525/463; 525/467
(58) Field of Search ................................ 525/146, 165, 525/178, 340, 341, 377, 420, 423, 437, 438, 449, 462, 463, 467

(56) References Cited

U.S. PATENT DOCUMENTS

| | | | | |
|---|---|---|---|---|
| 4,330,658 A | * | 5/1982 | Ikeguchi et al. | 528/73 |
| 4,330,669 A | * | 5/1982 | Ikeguchi et al. | 528/289 |
| 4,334,045 A | * | 6/1982 | Wu et al. | 525/439 |
| 4,338,373 A | * | 7/1982 | Ikeguchi et al. | 428/383 |
| 4,414,366 A | * | 11/1983 | Wu et al. | 525/439 |
| 4,645,805 A | * | 2/1987 | Gaku et al. | 525/437 |
| 4,717,609 A | * | 1/1988 | Gaku et al. | 428/40.1 |
| 4,754,001 A | * | 6/1988 | Blahak et al. | 525/437 |
| 4,820,769 A | * | 4/1989 | Gaku et al. | 525/113 |
| 4,885,346 A | * | 12/1989 | Kramer et al. | 525/426 |
| 4,902,752 A | * | 2/1990 | Shimp | 525/390 |
| 4,996,267 A | * | 2/1991 | Gerth et al. | 525/423 |
| 5,089,555 A | * | 2/1992 | Kitagawa et al. | 524/503 |
| 5,143,785 A | * | 9/1992 | Pujol et al. | 428/352 |
| 5,250,635 A | * | 10/1993 | Powell et al. | 525/467 |
| 5,330,684 A | * | 7/1994 | Emori et al. | 252/512 |
| 5,403,896 A | * | 4/1995 | Khanna et al. | 525/420 |
| 5,705,548 A | * | 1/1998 | Matsuoka et al. | 524/209 |

FOREIGN PATENT DOCUMENTS

| | | | |
|---|---|---|---|
| EP | 386358 | * | 9/1990 |
| EP | 0386358 | | 9/1990 |
| EP | 604367 | * | 6/1994 |
| EP | 0604367 | | 6/1994 |
| EP | 628588 | * | 12/1994 |
| EP | 0628588 | | 12/1994 |
| JP | 1-006019 | * | 1/1989 |
| WO | 93/24566 | * | 12/1993 |
| WO | 95/35343 | * | 12/1995 |

OTHER PUBLICATIONS

Derwent Abstr. 89–050153 for JP 01006019 (1989).

* cited by examiner

*Primary Examiner*—Rabon Sergent
(74) *Attorney, Agent, or Firm*—Tyler A. Stevenson

(57) ABSTRACT

By heating at above the melting point and/or glass transition point of the polycondensate and adding an aromatic dicyanate; or adding a mixture comprising an aromatic dicyanate and a polyfunctional compound selected from the class of sterically hindered hydroxyphenyl-alkyl-phosphonic esters and monoesters, diphosphonites and secondary aromatic amines; or adding a mixture comprising (i) an aromatic dicyanate, (ii) at least one polyfunctional compound selected from the class of sterically hindered hydroxyphenyl-alkyl-phosphonic esters and monoesters, diphosphonites and secondary amines, and (iii) a difunctional epoxide, it is possible to bring about an increase in the molecular weight and/or viscosity of virgin polycondensate and polycondensate recyclates.

19 Claims, No Drawings

PROCESS FOR INCREASING THE MOLECULAR WEIGHT OF POLYCONDENSATES

This is a continuation-in-part of application Ser. No. 09/125,178, filed Aug. 12, 1998, now abandoned, which is a 371 of PCT/EP97/00492, filed Feb. 4, 1997.

The invention relates to a process for increasing the molecular weight and/or viscosity of polycondensates which remain thermoformable after the process.

Polycondensates, such as polyamides, polyesters and polycarbonates, are important engineering plastics with a wide variety of potential uses, for example in the form of films, bottles, fibers and injection mouldings. It is common to these polymers that they are prepared by polycondensation reactions.

Damage to such polycondensates through processing and use leads, owing to chain cleavage, to polymer fragments containing functional end groups.

The mechanical and physical properties of polymers are crucially dependent on the molecular weight of the polymer. High-grade recycling of used polyesters, polyamides and polycarbonates from production wastes, for example from fiber production and injection moulding, is only possible to a restricted extent without aftertreatment, owing to the reduced molecular weight. For certain applications there is also a demand for high molecular mass virgin polycondensates, the synthesis of which is difficult.

Increasing the molecular weight of polycondensates such as polyamides or polyesters, for example, is known in principle. One possibility, for example, is post-condensation in the solid state ("solid state polycondensation") as is described in "Ullmann's Encyclopedia of Industrial Chemistry Vol. A 21, 5th Edition", page 188 [polyamides] and page 236 [polyesters] (1992) and is also practised industrially. An alternative method is the build-up of molecular weight by means of reactive additives, such as epoxides, tetracarboxylic dianhydrides, diisocyanates, bisoxazolines or dicarboxylic bisimides, which is referred to in general as chain extension and is disclosed, for example, in EP-A-0 074 337.

EP-A-0 604 367 discloses a process for increasing the molecular weight of polyamides which comprises heating a polyamide, with the addition of a polyfunctional epoxy resin and of a sterically hindered hydroxyphenyl-alkyl-phosphonic ester or monoester, at above the melting point or glass transition point of the polyamide.

U.S. Pat. No. 5,496,920 likewise discloses a process for increasing the molecular weight of polyamides, which comprises heating a polyamide, with the addition of a bismaleimide and of a sterically hindered hydroxyphenyl-alkyl-phosphonic ester or monoester, at above the melting point and/or glass transition point of the polyamide.

The use of reactive additives, for example epoxides, for building up the molecular weight of polycondensates has the disadvantage that relatively long reaction times are quite often necessary. Under such conditions, it is not possible to rule out follow-on reactions, such as discoloration, increased oxidation or uncontrolled crosslinking of the polycondensate, for example. Moreover, commercially available epoxides are often liquid products, especially if a high content of functional groups is necessary, whose addition to the polycondensate employed causes difficulties.

The object of the present invention, therefore, was to provide a system for building up the molecular weight of polycondensates which is highly effective in a relatively short reaction time and which lacks the disadvantages set out above.

WO-A-90/00574 discloses the preparation of polyiminocarbonates starting from bisphenols and dicyanates.

JP-A-04 202 316 discloses a resin composition comprising two polyesters with different glass transition temperatures and a polycyanate. This resin composition is suitable, in contact with sheet steel, for reducing the vibration of the sheet steel ("damping sheet steel") in a relatively large temperature range, and can also be used as a bonding coat between two steel sheets. In that publication there is no indication that polycyanates are suitable for inducing an increase in the molecular weight of the polyester in the melt.

It has now surprisingly been found that aromatic dicyanates are suitable for increasing the molecular weight and/or viscosity of virgin polycondensate or polycondensate recyclate (i.e. recycled polycondensate) or of a mixture thereof.

The present invention therefore provides a process for increasing the molecular weight and or viscosity of polycondensates which remain thermoformable after the process, which comprises heating a polycondensate, with addition of at least one aromatic dicyanate, at above the melting point or glass transition point of the polycondensate.

A thermoformable polymer is a polymer which is neither crosslinked nor cured in the manner of a thermoset resin. The build-up of molecular weight according to the present invention is referred to in general as chain extension and is disclosed, for example, in EP-A-0 074 337.

The invention also provides a process for increasing the molecular weight and/or viscosity of polycondensates which remain thermoformable after the process, which comprises heating a polycondensate, with the addition of at least one aromatic dicyanate and at least one polyfunctional compound selected from the group consisting of the sterically hindered hydroxyphenyl-alkyl-phosphonic esters and monoesters, diphosphonites or secondary aromatic amines, at above the melting point or glass transition point of the polycondensate.

The present invention also provides a process for increasing the molecular weight and/or viscosity of polycondensates which remain thermoformable after the process, which comprises heating a polycondensate, with the addition (i) of at least one aromatic dicyanate; (ii) of at least one polyfunctional compound selected from the group consisting of the sterically hindered hydroxyphenyl-alkyl-phosphonic esters and monoesters, diphosphonites or secondary aromatic amines; and (iii) of a difunctional epoxide, at above the melting point or glass transition point of the polycondensate.

The increase in molecular weight brings about improvement in the properties of the polycondensates, which becomes evident, for example, in the injection-moulding sector, in the extrusion sector and, in particular, in connection with recyclates. With the aid of the novel process it is possible, in particular, to achieve an increase in molecular weight in polycondensate recyclates from production wastes, as are obtained, for example, during the manufacture of fibers, or from the collection of used industrial components, for example from automotive and electrical applications. This allows recyclates to be passed on for high-grade re-use, for example as high-performance fibers, injection mouldings, extrusion applications or foams. Such recyclates also originate, for example, from industrial or domestic collections of recyclable materials, from production waste, for example from fiber production and trimmings, or from obligatory takeback schemes, for example collections of PET drinks bottles.

A preferred polycondensate is a polycondensate recyclate.

The novel process is of particular interest if the polycondensate is a polyamide, a polyester, a polycarbonate or a copolymer of these polymers.

In addition to polyester, polyamide or polycarbonate, the present invention also embraces the corresponding copolymers and blends, for example PBT/PS, PBT/ASA, PBT/ABS, PBT/PC, PET/ABS, PET/PC, PBT/PET/PC, PBT/PET, PA/PP, PA/PE and PA/ABS. However, in this context it must be borne in mind that the novel process, like all methods which permit substitution reactions, for example transesterification or transamidation, between the blend components, may result in the blend being influenced, i.e. may lead to the formation of copolymeric structures.

Of particular interest is a process wherein the polycondensate is a PBT/PC blend or a blend comprising predominantly PBT/PC or a corresponding recyclate or a blend of a recyclate and a virgin polymer component.

The term polyamides, i.e. both virgin polyamide and polyamide recycdates, refers to aliphatic and aromatic polyamides or copolyamides derived from diamines and dicarboxylic acids and/or from aminocarboxylic acids or their corresponding lactams. Examples of suitable polyamides are PA 6, PA 11, PA 12, PA 46, PA 6.6, PA 6.9, PA 6.10 or PA 6.12, PA 10.12, PA 12.12 and also amorphous polyamides of the types Trogamid PA 6-3-T and Grilamid TR 55. Polyamides, of the type mentioned are generally known and are obtainable commercially As polyamides use is preferably made of crystalline or partly crystalline polyamides, and especially PA 6 or PA 6.6 or mixtures thereof, and also of recydates based on them, or copolymers thereof.

The polyester, i.e. both virgin polyester and polyester recyclate, can comprise homopolyesters or copolyesters which are composed of aliphatic, cycloaliphatic or aromatic dicarboxylic acids and diols or hydroxycarboxylic acids.

The aliphatic dicarboxylic acids can contain 2 to 40 carbon atoms, the cycloaliphatic dicarboxylic acids 6 to 10 carbon atoms, the aromatic dicarboxylic acids 8 to 14 carbon atoms, the aliphatic hydroxycarboxylic acids 2 to 12 carbon atoms, and the aromatic and cycloaliphatic hydroxycarboxylic acids 7 to 14 carbon atoms.

The aliphatic diols can contain 2 to 12 carbon atoms, the cycloaliphatic diols 5 to 8 carbon atoms, and the aromatic diols 6 to 16 carbon atoms.

The diols referred to as aromatic are those in which two hydroxyl groups are attached to one or to different aromatic hydrocarbon radicals.

It is additionally possible for the polyesters to be branched with small amounts, for example, from 0.1 to 3 mol %, based on the dicarboxylic acids present, of more than difunctional monomers (e.g. pentaerythritol, trimellitic acid, 1,3,5-tri(hydroxyphenyl)benzene, 2,4-dihydroxybenzoic acid or 2-(4-hydroxyphenyl)-2-(2,4dihydroxyphenyl) propane).

In the case of polyesters consisting of at least 2 monomers, these can be distributed randomly, or the polymers can be block copolymers.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those with 2 to 40 carbon atoms, examples being oxalic, malonic, dimethylmalonic, succinic, pimelic, adipic, trimethyladipic, sebacic and azelaic acids and dimer acids (dimerization products of unsaturated aliphatic carboxylic acids such as oleic acid), and alkylated malonic and succinic acids, such as octadecylsuccinic acid.

Suitable cycloaliphatic dicarboxylic acids are 1,3-cyclobutanedicarboxylic acid, 1,3-cyclopentanedicarboxylic acid, 1,3- and 1,4-cyclohexanedicarboxylic acid, 1,3- and 1,4-di(carboxylmethyl)cyclohexane and 4,4'-dicyclohexyldicarboxylic acid.

Particularly suitable aromatic dicarboxylic acids are terephthalic acid, isophthalic acid, o-phthalic acid, and 1,3-, 1,4-, 2,6- or 2,7-naphthalenedicarboxylic acid, 4,4'-diphenyldicarboxylic acid, 4,4'-diphenyl sulfone dicarboxylic acid, 4,4'-benzophenonedicarboxylic acid, 1,1,3-trimethyl-5-carboxyl-3-(p-carboxyphenyl)indane, 4,4'-diphenyl ether dicarboxylic acid, bis-(p-carboxyphenyl) methane or bis-(p-carboxyphenyl)ethane.

Preference is given to the aromatic dicarboxylic acids, especially terephthalic acid, isophthalic acid and 2,6-naphthalenedicarboxylic acid.

Other suitable dicarboxylic acids are those containing —CO—NH— groups; they are described in DE-A-2 414 349. Also suitable are dicarboxylic acids containing N-heterocyclic rings, for example those which are derived from carboxyalkylated, carboxyphenylated or carboxybenzylated monoamine-s-triazinedicarboxylic acids (cf. DE-A-2 121 184 and 2 533 675), from mono- or bishydantoins, from unsubstituted or halogenated benzimidazoles, or from parabanic acid. The carboxyalkyl groups in these compounds can contain 3 to 20 carbon atoms.

Suitable aliphatic diols are the linear and branched aliphatic glycols, especially those having 2 to 12, in particular 2 to 6, carbon atoms in the molecule, for example ethylene glycol, 1,2- and 1,3-propylene glycol, 1,2-, 1,3-, 2,3- or 1,4-butanediol, pentylglycol, neopentylglycol, 1,6-hexanediol and 1,12-dodecanediol. An example of a suitable cycloaliphatic diol is 1,4-dihydroxycyclohexane. Examples of further suitable aliphatic diols are 1,4-bis(hydroxymethyl) cyclohexane, aromatic-aliphatic diols, such as p-xylylene glycol or 2,5-dichloro-p-xylylene glycol, 2,2-bis(β-hydroxyethoxyphenyl)propane, and also polyoxyalkylene glycols, such as diethylene glycol, triethylene glycol, polyethylene glycol or polypropylene glycol. The alkylenediols are preferably linear and, in particular, contain 2 to 4 carbon atoms.

Preferred diols are the alkylenediols, 1,4-dihydroxycyclohexane, and 1,4-bis(hydroxymethyl) cyclohexane. Particular preference is given to ethylene glycol, 1,4-butanediols and 1,2- and 1,3-propylene glycol.

Further suitable aliphatic diols are the β-hydroxyalkylated, especially β-hydroxyethylated, bisphenols, such as 2,2-bis[4'-(β-hydroxyethoxy)phenyl] propane. Further bisphenols are mentioned later.

A further group of suitable aliphatic diols are the heterocydic diols described in DE-A 1 812 003, 2 342 432, 2 342 372 and 2 453 326. Examples are N,N'-bis(β-hydroxyethyl)-5,5-dimethylhydantoin, N,N'-bis (βhydroxypropyl)-5,5-dimethylhydantoin, methylene bis[N-(β-hydroxyethyl)-5-methyl-5-ethylhydantoin], methylene bis[N-(βhydroxyethyl)-5,5-dimethyl-hydantoin], N,N'-bis (β-hydroxyethyl)benzimidazolone, N,N'-bis (βhydroxyethyl)(tetrachloro)-benzimidazolone, or N,N'-bis (βhydroxyethyl)(tetrabromo)benzimidazolone.

Suitable aromatic diols are monocyclic diphenols and especially bicyclic diphenols carrying a hydroxyl group on each aromatic ring. The term aromatic is preferably taken to mean hydrocarbon-aromatic radicals, for example phenylene or naphthylene. Besides, for example, hydroquinone, resorcinol and 1,5-, 2,6- and 2,7-dihydroxynaphthalene, particular mention should be made of the bisphenols which can be described by the following formulae:

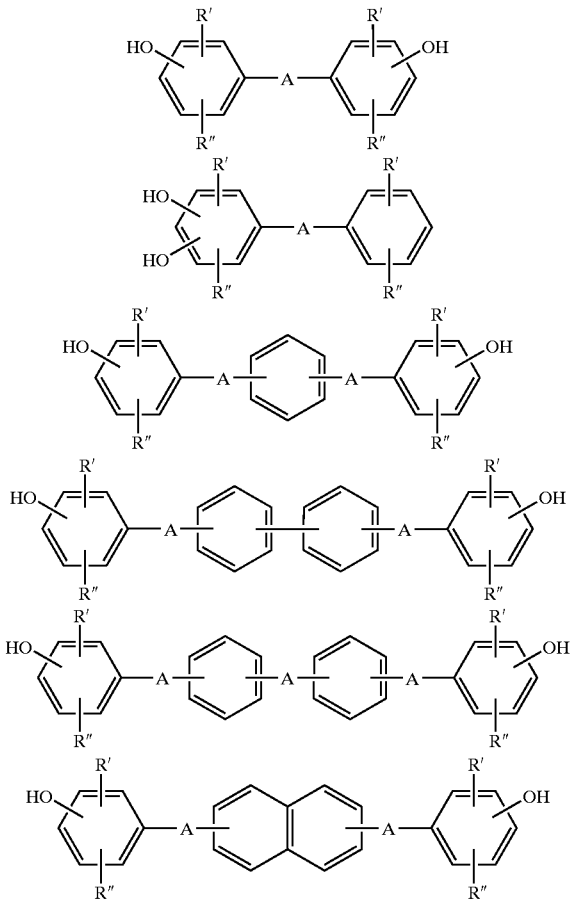

The hydroxyl groups can be in the m-position, but in particular in the p-positon; R' and R" in these formulae can be alkyl of 1 to 6 carbon atoms, halogen such as chlorine or bromine, and especially hydrogen atoms. A can be a direct bond, or oxygen, sulfur, —SO—, —SO$_2$—,

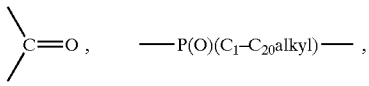

substituted or unsubstituted alkylidene, cycloalkylidene or alkylene.

Examples of unsubstituted or substituted alkylidene are ethylidene, 1,1- or 2,2-propylidene, 2,2-butylidene, 1,1-isobutylidene, pentylidene, hexylidene, heptylidene, octylidene, dichloroethylidene and trichloroethylidene.

Examples of substituted or unsubstituted alkylene are methylene, ethylene, phenylmethylene, diphenylmethylene and methylphenylmethylene. Examples of cycoalkylidene are cyclopentylidene, cyclohexylidene, cycloheptylidene and cyclooctylidene.

Examples of bisphenols are bis(p-hydroxyphenyl) ether or thioether, bis(p-hydroxyphenyl) sulfone, bis(p-hydroxyphenyl)methane, bis(4-hydroxyphenyl)-2,2'-biphenyl, phenylhydroquinone, 1,2-bis(p-hydroxyphenyl)ethane, 1-phenylbis(p-hydroxyphenyl)methane, diphenylbis(p-hydroxyphenyl)methane, diphenylbis(p-hydroxyphenyl)ethane, bis(3,5-dimethyl-4-hydroxyphenyl) sulfone, bis(3,5-dimethyl-4-hydroxyphenyl)-p-diisopropylbenzene, bis(3,5-dimethyl4hydroxyphenyl)-m-diisopropylbenzene, 2,2-bis(3',5'-dimethyl-4'-hydroxyphenyl)-propane, 1,1- or 2,2-bis(p-hydroxyphenyl)butane, 2,2-bis(p hydroxyphenyl) hexafluoropropane, 1,1-dichloro- or 1,1,1-trichloro-2,2-bis(p-hydroxyphenyl)ethane, 1,1-bis(hydroxyphenyl) cyclopentane and, especially, 2,2-bis(p-hydroxyphenyl) propane (bisphenol A) and 1,1-bis(p-hydroxyphenyl) cyclohexane (bisphenol C).

Examples of suitable polyesters of hydroxycarboxylic acids are polycaprolactone, polypivalolactone or the polyesters of 4-hydroxycyclohexanecarboxylic acid or 4-hydroxybenzoic acid.

Also suitable are polymers which contains predominantly ester linkages, but which can also contain other linkages, such as, for example polyesteramides or polyesterimides.

Polyesters with aromatic dicarboxylic acids have acquired the greatest importance, especially the polyalkylene terephthalates. Preference is therefore given to novel moulding compositions in which the polyester is built up from at least 30 mol %, preferably at least 40 mol %, of aromatic dicarboxylic acids, and at least 30 mol %. preferably at least 40 mol %, of alkylenediols having preferably 2 to 12 carbon atoms, based on the polyester.

In particular in this case the alkylenediol is linear and contains 2 to 6 carbon atoms, for as example ethylene or tri-, tetra- or hexamethylene glycol, and the aromatic dicarboxylic acid is terephthalic and/or isophthalic acid.

The novel process is likewise of particular interest if the polycondensate is a polyester.

Particularly suitable polyesters are PET, PBT or PEN (polyethylene naphthylate) and corresponding copolymers, especial preference being given to PET and its copolymers. The process also acquires particular importance in connection with PET recyclates, which are obtained, for example, from bottle collections, for example from collections by the drinks industry. These materials consist, preferably, of terephthalic acid, 2,6naphthalene-dicarboxylic acid and/or isophthalic acid in combination with ethylene glycol and/or 1,4-bis(hydroxymethyl)cyclohexane.

The term polycarbonate (PC) refers both to virgin polycarbonate and to polycarbonate recyclate. PC is obtained, for example, from bisphenol A and phosgene or a phosgene analogue, such as trichloromethyl chloroformate, triphosgene or diphenylcarbonate, by condensation, in the latter case generally with addition of a suitable transesterification catalyst, for example a borohydride, an amine, such as 2-methylimidazole, or a quatemary ammonium salt; besides bisphenol A, other bisphenol components can additionally be used, and monomers which are halogenated in the benzene ring can also be employed. Particularly suitable bisphenol components which may be mentioned are 2,2-bis(4'-hydroxyphenyl)propane (bisphenol A), 2,4'-dihydroxydiphenylmethane, bis(2-hydroxyphenyl)methane, bis(4-hydroxyphenyl)methane, bis(4-hydroxy-5-propylphenyl)-methane, 1,1-bis(4'-hydroxyphenyl)ethane, bis(4-hydroxyphenyl)cyclohexylmethane, 2,2-bis(4'-hydroxyphenyl)-1-phenylpropane, 2,2-bis(3',5'-dimethyl4'-hydroxyphenyl)propane, 2,2-bis(3',5'-dibromo-4'-hydroxyphenyl)propane, 2,2-bis(3',5'-dichloro-4'-hydroxyphenyl)-propane, 1,1-bis(4'-hydroxyphenyl)-cyclododecane, 1,1-bis(3',5'-dimethyl-4'-hydroxyphenyl)-cyclododecane, 1,1-bis(4'-hydroxyphenyl)-3,3,5-trimethylcyclohexane, 1,1-bis(4'-hydroxy-phenyl)-3,3,5,5-tetramethylcyclohexane, 1,1-bis(4'-hydroxyphenyl)-3,3,5-trimethylcyclo-pentane and the other bisphenols indicated further above. Furthermore, the polycarbonates may also be branched as a result of appropriate amounts of monomers having a functionality of more than two (examples as given further above for the polyesters).

The novel process is also of particular interest if the polycondensate is a polycarbonate.

The polycondensate copolymers or blends which can be used in the novel process are prepared in a conventional manner from the starting polymers. The polyester component is preferably PBT and the PC component is preferably a PC based on bisphenol A. The polyester:PC ratio is preferably from 95:5 to 5:95, particular preference being given to a ratio in which one component makes up at least 75%.

The invention acquires particular importance in connection with polycondensate recyclates as obtained from production waste, collections of recyclable material, or as a result of obligatory takeback schemes, for example in the automotive, industry, in the electrical sector, compact discs or twin-wall sheets. The polycondensate recyclates have suffered thermal and/or hydrolytic damage in a variety of ways. Moreover, these recyclates may also include minor amounts of admixed plastics having a different structure, for example polyolefins, polyurethanes, ABS or PVC. Furthermore, these recyclates can also include customary impurities, for example residues of dyes, adhesives, contact media or paints, traces of metal, traces of water, traces of service fluids, or inorganic salts.

Aromatic dicyanates in the context of this invention are known, for example, from U.S. Pat. No. 3,491,060 and are, preferably, compounds of the formula I

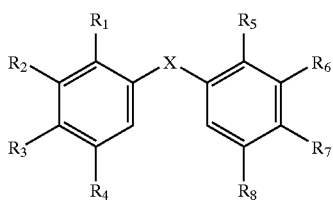

(I)

in which

X is a direct bond, oxygen, sulfur, —SO—, —SO$_2$—,

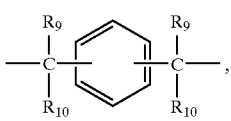

$C_2$–$C_{18}$alkylene, $C_2$–$C_{18}$alkenylene or

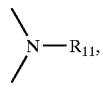

$R_1$, $R_2$, $R_3$ and $R_4$ independently of one another are hydrogen, $C_1$–$C_{25}$alkyl, $C_5$–$C_{12}$cycloalkyl, unsubstituted or $C_1$–$C_4$alkyl-substituted phenyl; $C_7$–$C_9$phenylalkyl, hydroxyl, $C_1$–$C_{25}$alkoxy or —O—CN, with the proviso that at least one of the radicals $R_1$, $R_2$, $R_3$ and $R_4$ is —O—CN, $R_5$, $R_6$, $R_7$ and $R_8$ independently of one another are hydrogen, $C_1$–$C_{25}$alkyl, $C_5$–$C_{12}$cyloalkyl, or unsubstituted or $C_1$–$C_4$alkyl-substituted phenyl; $C_7$–$C_9$phenylalkyl, hydroxyl, $C_1$–$C_{25}$alkoxy —O—CN, with the proviso that at least one of the radicals $R_5$, $R_6$, $R_7$and $R_8$ is —O—CN, $R_9$ and $R_{10}$ independently of one another are hydrogen, $C_1$–$C_{12}$alkyl, trifluoromethyl or phenyl, or $R_9$ and $R_{10}$, together with the carbon atom to which they are attached, form a $C_5$–$C_8$cycloalkylidene ring which is unsubstituted or is substituted by 1 to 3 $C_1$–$C_4$alkyls; and $R_{11}$ is hydrogen or $C_1$–$C_{12}$alkyl.

$C_2$–$C_{18}$alkylene is a branched or unbranched radical such as, for example, ethylene, propylone, trimethylene, tetramethylene, pentamethylene, hexamethylene, heptamethylene, octamethylene, docamethylene, dodecamethylene or octadecamethylene. Preference is given to $C_2$–$C_{12}$alkylene, especially $C_2$–$C_8$alkylene, for example $C_2$–$C_4$alkylene.

$C_2$–$C_{18}$alkenylene is a branched or unbranched radical having one or more C—C double bonds, such as, for example, vinylene, methylvinylene, octenylethylene or dodecenylethylene. Preference is given to $C_2$–$C_{12}$alkenylene, especially $C_2$–$C_8$alkenylene, for example $C_2$–$C_4$alkenylene.

Alkyl having up to 25 carbon atoms is a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred definitions of $R_1$, $R_2$, $R_4$, $R_5$, $R_6$, $R_7$ and $R_8$ is, for example, $C_1$–$C_{18}$alkyl, especially $C_1$–$C_{12}$alkyl, e.g. $C_1$–$C_8$alkyl. A preferred definition of $R_9$ and $R_{10}$ is, for example, $C_1$–$C_8$alkyl, especially $C_1$–$C_4$alkyl, e.g. methyl. A particularly preferred definition of $R_{11}$ is, for example, $C_1$–$C_8$alkyl, especially $C_1$–$C_4$alkyl, e.g. methyl, ethyl, n-propyl or n-butyl.

$C_5$–$C_{12}$cycloalkyl is, for example, cyclopentyl, cyclohexyl, cycloheptyl, cyclooctyl, cyclodecyl or cyclododecyl. A preferred definition of $R_1$, $R_2$, $R_3$, $R_4$, $R_5$, $R_6$, $R_7$ and $R_8$ is, for example, $C_5$–$C_8$cycloalkyl, especially $C_5$–$C_7$cyloalkyl, e.g. cyclohexyl.

$C_1$–$C_4$alkyl-substituted phenyl, which preferably contains 1 to 3, especially 1 or 2 alkyl groups, is, for example, o-, m- or p-methylphenyl, 2,3dimethylphenyl, 2,4-dimethylphenyl, 2,5-dimethylphenyl, 2,6-dimethylphenyl, 3,4-dimethylphenyl, 3,5-dimethylphenyl, 2-methyl-6ethylphenyl, 4tert-butylphenyl or 2-ethylphenyl, 2,6-diethylphenyl.

$C_7$–$C_9$phenylalkyl is, for example, benzyl, α-methylbenzyl or α,α-dimethylbenzyl. Benzyl is preferred.

Alkoxy having up to 25 carbon atoms is a branched or unbranched radical such as, for example, methoxy, ethoxy, propoxy, isopropoxy, n-butoxy, isobutoxy, pentoxy, isopentoxy, hexyloxy, heptyloxy, octyloxy, decyloxy, tetradecyloxy, hexadecyloxy or octadecyloxy. A preferred definition of $R_1$, $R_2$, $R_3$, $R_4$, $R_5$, $R_6$, $R_7$ and $R_8$ is, for example, $C_1$–$C_{18}$alkoxy, especially $C_1$–$C_{12}$alkoxy, e.g. $C_1$–$C_8$alkoxy. Methoxy is particularly preferred.

A $C_1$–$C_4$alkyl-substituted $C_5$–$C_8$cycloalkyliden ring, which preferably contains 1 to 3, especially 1 or 2 branched or unbranched alkyl groups, is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene or cyclooctylidene. Preference is given to cyclohexylidene and 4-tert-butylcyclohexylidene.

Particular preference is given to the compounds of the formula I in which

X is a direct bond, oxygen,

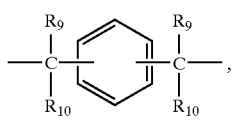

$C_2$–$C_{12}$alkylene or $C_2$–$C_{12}$alkenylene, $R_1$, $R_2$, $R_3$ and $R_4$ independently of one another are hydrogen, $C_1$–$C_{18}$alkyl, $C_5$–$C_8$cycloalkyl, phenyl, benzyl, $C_1$–$C_{18}$alkoxy or —O—CN, with the proviso that at least one of the radicals $R_1$, $R_2$, $R_3$ or $R_4$ is —O—CN, $R_5$, $R_6$, $R_7$ and $R_8$ independently of one another are hydrogen, $C_1$–$C_{18}$alkyl, $C_5$–$C_8$cycloalkyl, phenyl, benzyl, $C_1$–$C_{18}$alkoxy or —O—CN, with the proviso that at least one of the radicals $R_5$, $R_6$, $R_7$ or $R_8$ is —O—CN, and $R_9$ and $R_{10}$ independently of one another are hydrogen, $C_1$–$C_8$alkyl, trifluoromethyl or phenyl, or $R_9$ and $R_{10}$, together with the carbon atom to which they are attached, form a $C_5$–$C_8$cycloalkylidene ring.

Examples of particularly preferred aromatic dicyanates of the formula I are the compounds of the formula Ia, Ib, Ic, Id, Ie or If

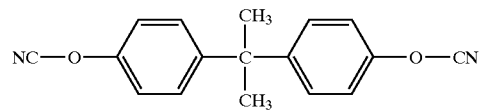
(Ia)

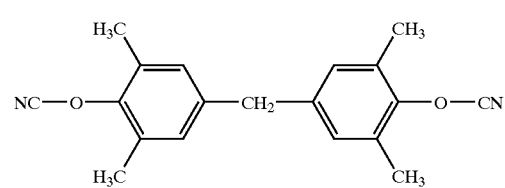
(Ib)

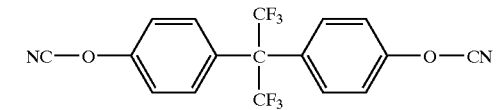
(Ic)

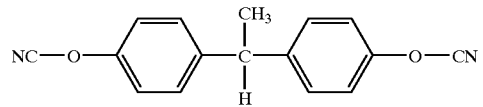
(Id)

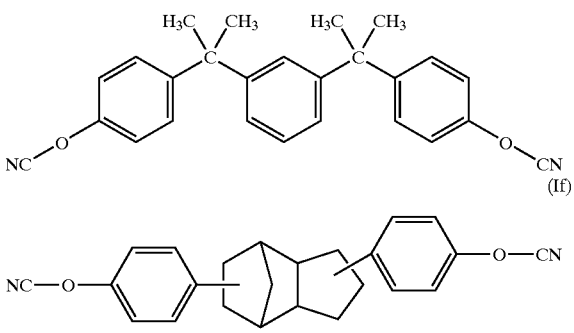
(Ie)

(If)

The compound of the formula Ia is also referred to as BPC (bisphenol A dicyanate). The compounds of the formulae Ia to If are obtainable commercially under the following names: AroCy®B-10 (Rhone-Poulenc, compound of the formula Ia); AroCy® M-10 (Rhone-Poulenc, compound of the formula Ib); AroCy® F-10 (Rhone-Poulenc, compound of the formula Ic); AroCy® L-10 (Rhone-Poulenc, compound of the formula Id); RTX® 366 (Rhone-Poulenc, compound of the formula Ie); and XU® 71787 (Dow Chemical Co., compound of the formula If).

Of particular interest are the aromatc dicyanates of the formula I in which $R_1$ and $R_5$ are hydrogen, $R_2$, $R_4$, $R_6$ and $R_8$ are hydrogen or methyl, and $R_3$ and $R_7$ are —O—CN.

Of specific interest are the compounds of the formula I in which

X is a direct bond,

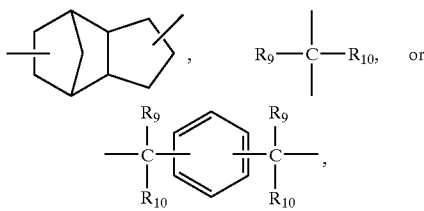

$R_1$ is hydrogen, $R_2$ is hydrogen or $C_1$–$C_4$alkyl, $R_3$ is —O—CN, $R_4$ is hydrogen or $C_1$–$C_4$alkyl, $R_5$ is hydrogen, $R_6$ is hydrogen or $C_1$–$C_4$alkyl, $R_7$ is —O—CN, $R_8$ is hydrogen or $C_1$$C_4$alkyl, and $R_9$ and $R_{10}$ independently of one another are hydrogen, methyl or trifluoromethyl.

Very particular preference is given to the compounds of the formula I in which

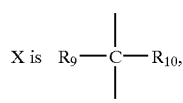

$R_1$ and $R_2$ are hydrogen, $R_3$ is —O—CN, $R_4$, $R_5$ and $R_6$ are hydrogen, $R_7$ is —O—CN, $R_8$ is hydrogen, and $R_9$ and $R_{10}$ independently of one another are hydrogen or methyl.

Particularly preferred aromatic dicyanates are those of the formula Ia and Id.

Based on 100 parts of polycondensate, preferably from 0.01 to 5 parts, particularly preferably from 0.02 to 2 parts and, in particular, from 0.05 to 1 part of the aromatic dicyanat are employed.

Polyfunctional compounds from the class of the sterically hindered hydroxyphenyl-alkyl-phosphonic esters and monoesters have been disclosed, for example, in U.S. Pat. No. 4,778,840 and are, for example, compounds of the formula II $$\text{HO}-\underset{\underset{R_{22}}{|}}{\overset{\overset{R_{21}}{|}}{\bigcirc}}-(CH_2)_n-\overset{\overset{O}{\|}}{\underset{\underset{OR_{23}}{|}}{P}}-OR_{24} \quad (II)$$

in which $R_{21}$ is isopropyl, tert-butyl, cyclohexyl or cyclohexyl which is substituted by 1 to 3 $C_1$–$C_4$alkyl groups, $R_{22}$ is hydrogen, $C_1$–$C_4$alkyl, cyclohexyl or cyclohexyl which is substituted by 1 to 3 $C_1$–$C_4$)alkyl groups, $R_{23}$ is $C_1$–$C_{20}$alkyl, or unsubstituted or $C_1$–$C_4$alkyl-substituted phenyl or naphthyl, $R_{24}$ is hydrogen, $C_1$–$C_{20}$alkyl, unsubstiuted or $C_1$–$C_4$alkyl-substituted phenyl or naphthyl; or is $$\frac{M^{r+}}{r},$$

$M^{r+}$ is an r-valent metal cation, n is 1, 2, 3, 4, 5 or 6, and r is 1, 2 or 3.

Where substituents are alkyl having up to 20 carbon atoms, the relevant radicals are those such as methyl, ethyl, propyl, butyl, pentyl, hexyl and octyl, stearyl and corresponding branched isomers. A preferred definition of $R_{23}$ and $R_{24}$ is $C_1$–$C_{12}$alkyl, especially $C_1$–$C_9$alkyl, e.g. $C_2$–$C_4$alkyl.

$C_1$–$C_4$alkyl-substituted phenyl or naphthyl, which preferably contains 1 to 3, especially 1 or 2 alkyl groups, is, for example. o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, 1-methylnaphthyl, 2-methylnaphthyl, 4-methylnaphthyl, 1,6-dimethylnaphthyl or 4-tert-butylnaphthyl.

$C_1$–$C_4$alkyl-substituted cyclohexyl, which preferably contains 1 to 3, especially 1 or 2 branched or unbranched alkyl group radicals, is, for example, cyclopentyl, methylcyclopentyl, dimethylcyclopentyl, cyclohexyl, methylcyclohexyl, dimethylcyclohexyl, trimethylcyclohexyl or tert-butylcyclohexyl.

A mono-, di- or trivalent metal cation is preferably an alkali metal, alkaline earth metal, heavy metal or aluminium cation, for example $Na^+$, $K^+$, $Mg^{++}$, $Ca^{++}$, $Ba^{++}$, $Zn^{++}$ or $Al^{+++}$, $Ca^{++}$ is especially preferred.

Preferred compounds of the formula II are those having at least one tert-butyl group as radical $R_{21}$ or $R_{22}$. Very particular preference is given to compounds in which $R_{21}$ and $R_{22}$ are both tert-butyl.

n is preferably 1 or 2, especially 1.

Very particularly preferred stericaily hindered hydroxyphenyl-alkyl-phosphonic esters and monoesters are the compounds of the formulae IIa and IIb.

$$\text{HO}-\underset{\underset{(CH_3)_3C}{|}}{\overset{\overset{(CH_3)_3C}{|}}{\bigcirc}}-CH_2-\overset{\overset{O}{\|}}{\underset{\underset{OCH_2CH_3}{|}}{P}}-OCH_2CH_3 \quad (IIa)$$

$$\left[\text{HO}-\underset{\underset{(CH_3)_3C}{|}}{\overset{\overset{(CH_3)_3C}{|}}{\bigcirc}}-CH_2-\overset{\overset{O}{\|}}{\underset{\underset{OCH_2CH_3}{|}}{P}}-O^{\ominus}\right]_2 Ca^{2+} \quad (IIb)$$

The compound of the formula IIa is obtainable commercially under the name Irganox®1222 (Ciba-Geigy) and that of the formula IIb under the name Irganox®1425 (Ciba-Geigy).

Based on 100 parts of polycondensate, preferably from 0.01 to 5 parts, particularly preferably from 0.02 to 2 parts and, in particular, from 0.05 to 1 part of a sterically hindered hydroxyphenyl-alkyl-phosphonic ester or monoester are employed.

Polyfunctional compounds from the class of the diphosphonites are known, for example, from GBA-2 247 241 and are, for example, compounds of the formula III $$\left[\underset{\underset{R_{34}}{|}}{\overset{\overset{R_{32}}{|}}{R_{33}-\bigcirc-R_{31}}}-O\right]_2 P-Y-P\left[O-\underset{\underset{R_{40}}{|}}{\overset{\overset{R_{38}}{|}}{\bigcirc-R_{38}}}-R_{37}\right]_2 \quad (III)$$

in which $R_{31}$, $R_{32}$, $R_{33}$, $R_{34}$, $R_{35}$, $R_{36}$, $R_{37}$, $R_{38}$, $R_{39}$ and $R_{40}$ independently of one another are hydrogen or $C_1$–$C_8$alkyl, Y is 1,4-phenylene, 1,3phenylene, $$-\bigcirc-Z-\bigcirc-Z-\bigcirc- \quad \text{or}$$

$$-\bigcirc-Z-\bigcirc-, \text{ and}$$

Z is a direct bond, phenylene, oxygen, sulfur, —SO—, —SO$_2$— or

Alkyl having up to 8 carbon atoms is a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, tert-octyl or 2-ethylhexyl. One of the preferred definitions of $R_{31}$, $R_{32}$, $R_{33}$, $R_{34}$, $R_{35}$, $R_{36}$, $R_{37}$, $R_{38}$, $R_{39}$ and $R_{40}$ is, for example, $C_1$–$C_8$alkyl, especially $C_1$–$C_4$alkyl, e.g. methyl or tert-butyl.

Preference is given to the compounds of formula III in which at least two of the radicals $R_{31}$, $R_{32}$, $R_{33}$, $R_{34}$ and $R_{35}$ and at least two of the radicals $R_{36}$, $R_{37}$, $R_{38}$, $R_{39}$ and $R_{40}$ are hydrogen.

Also of interest are the compounds of formula III, in which $R_{32}$, $R_{34}$, $R_{35}$, $R_{37}$, $R_{39}$ and $R_{40}$ are hydrogen.

Particular preference is given to the compounds of the formula III in which

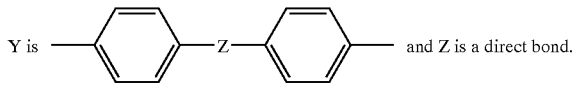

Very particular preference is given to tetrakis(2,4-di-tert-butylphenyl) 4,4'-biphenylene-diphosphonite (Irgafos®PEPQ, Ciba-Geigy) of the formula IIIa

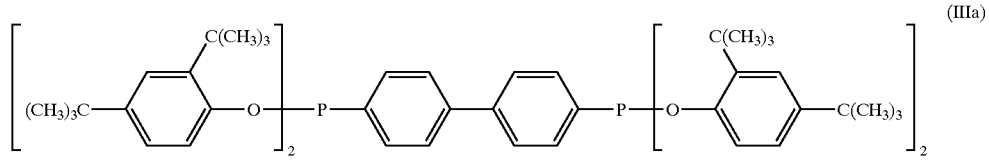

Based on 100 parts of polycondensate, preferably from 0.01 to 5 parts, particularly preferably from 0.02 to 2 parts and. In particular from 0.05 to 1 part of a diphosphonite are employed.

Compounds from the class of the secondary aromatic amines are known, for example, from R. Gächter and H. Müller, Hanser Vertag, "Plastics Additives Handbook, 3rd Ed.", page 44 to 45 (1990) and are, for example, compounds of the formula IV

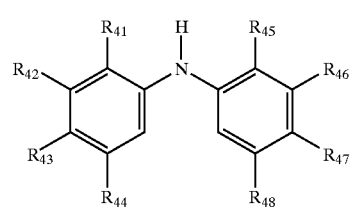

in which
$R_{41}$ is hydrogen or $C_1$–$C_{25}$alkyl,
$R_{42}$ is hydrogen, $C_1$–$C_{25}$alkyl or benzyl, $R_{43}$ is hydrogen, $C_1$–$C_{25}$alkyl, $C_5$–$C_{12}$cycloalkyl, benzyl, α-methylbenzyl or α,α-dimethylbenzyl;

or $R_{42}$ and $R_{43}$ together form a divalent group

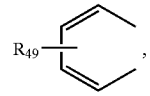

$R_{44}$ is hydrogen, $C_1$–$C_{25}$alkyl or benzyl, $R_{45}$ is hydrogen or $C_1$–$C_{25}$alkyl, $R_{46}$ is hydrogen, $C_1$–$C_{25}$alkyl or benzyl, $R_{47}$ is hydrogen, $C_1$–$C_{25}$alkyl, $C_5$–$C_{12}$cyloalkyl, benzyl, α-methylbenzyl, α,α-dimethylbenzyl or

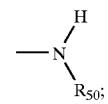

or $R_{45}$ and $R_{47}$ together form a divalent group

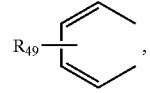

$R_{48}$ is hydrogen, $C_1$–$C_{25}$alkyl or benzyl, $R_{49}$ is hydrogen or $C_1$–$C_{25}$alkyl, and $R_{50}$ is $C_5$–$C_{12}$cycloalkyl,

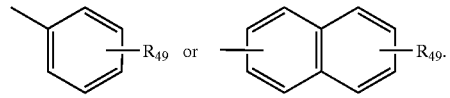

Alkyl having up to 25 carbon atoms is a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred definitions of $R_{41}$, $R_{42}$, $R_{44}$, $R_{45}$, $R_{46}$ and $R_{48}$ is, for example, $C_1$–$C_{18}$alkyl, especially $C_1$–$C_{12}$alkyl, e.g. $C_1$–$C_8$-alkyl. A particularly preferred definition of $R_{43}$ and $R_{47}$ is, for example, $C_1$–$C_{18}$alkyl, especially $C_1C_{12}$alkyl, e.g. $C_4$–$C_{12}$alkyl. A particularly preferred definition of $R_{43}$ and $R_{47}$ is $C_4$–$C_{10}$alkyl, especially $C_4$–$C_8$alkyl, e.g. tert-butyl or tertoctyl.

$C_5$–$C_{12}$cycloalkyl is, for example, cyclopentyl, cyclohexyl, cycloheptyl, cyclooctyl, cyclodecyl or cyclododecyl. A preferred definition of $R_{43}$, $R_{47}$ and $R_{50}$ is, for example, $C_5$–$C_8$cycloalkyl, especially $C_5$–$C_7$cycloalkyl, e.g. cyclohexyl.

Particular preference is given to the compounds of the formula IV in which $R_{41}$ and $R_{42}$ independently of one another are hydrogen or $C_1$–$C_{18}$alkyl, $R_{43}$ is hydrogen, $C_1$–$C_{18}$alkyl, $C_5$–$C_8$cycloalkyl, benzyl, α-methylbenzyl or αα-dimethylbenzyl;

or $R_{42}$ and $R_{43}$ together form a divalent group

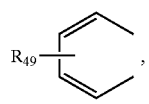

$R_{44}$, $R_{45}$ and $R_{46}$ independently of one another are hydrogen or $C_1$–$C_{18}$alkyl, $R_{47}$ is hydrogen, $C_1$–$C_{18}$alkyl, $C_5$–$C_8$cycloalkyl, benzyl, α-methylbenzyl, α,α-dimethylbenzyl or

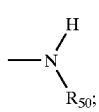

or $R_{48}$ and $R_{47}$ together form a divalent group

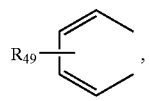

$R_{48}$ and $R_{49}$ independently of one another are hydrogen or $C_1$–$C_{18}$alkyl, and $R_{50}$ is $C_5$–$C_8$cycloalkyl,

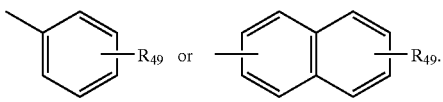

Of particular Interest are the secondary aromatic amines of the formula IV, in which $R_{41}$, $R_{44}$, $R_{45}$, $R_{46}$ and $R_{48}$ are hydrogen.

Of specific interest are the compounds of the formula IV, in which $R_{41}$ and $R_{42}$ are hydrogen, $R_{43}$ is hydrogen, $C_4$–$C_{12}$alkyl, cydohexyl, benzyl, α-methylbenzyl or α,α-dimethylbenzyl; or $R_{42}$ and $R_{43}$ together form a divalent group

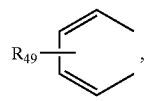

$R_{44}$, $R_{45}$ and $R_{46}$ are hydrogen, $R_{47}$ is hydrogen, $C_4$–$C_{12}$alkyl, cyclohexyl, benzyl, α-methylbenzyl, α,α-dimethylbenzyl or

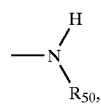

$R_{48}$ and $R_{49}$ is hydrogen, and $R_{50}$ is cydohexyl, phenyl or β-naphthyl.

Very particular preference is given to the secondary aromapic amines of formulae IVa, IVb, IVc, IVd, IVe and IVf.

(IVa)

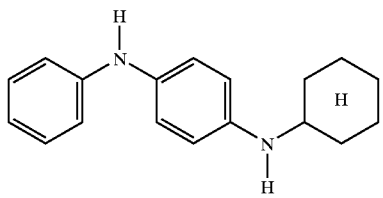

(IVb)

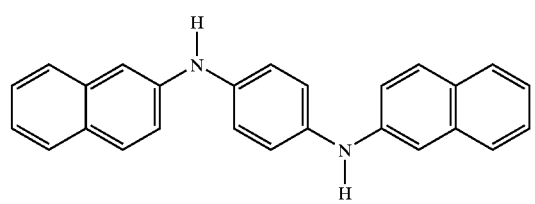

(IVc)

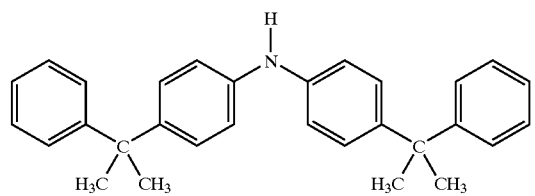

(IVd)

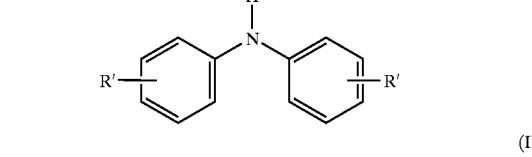

(IVe)

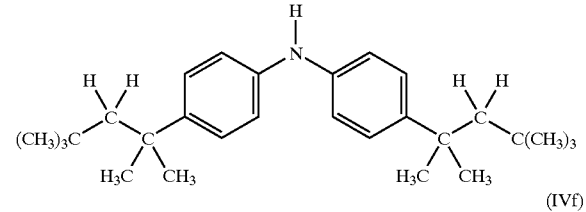

(IVf)

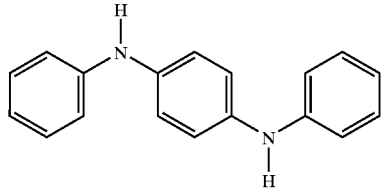

R' = n-butyl or n-octyl

An especially preferred secondary aromatic amine is the compound of the formula IVe [4,4'-di-tert-octyldiphenylamine, Irganox® 5057 (Ciba-Geigy)].

The compounds of the formula IV are known and some are commercially available or can be prepared as described in R. Gächter and H. Müller, Hanser Verlag, "Plastics Additives Handbook, 3rd Ed.," page 44 to 45 (1990) in analogy to the literature references cited therein.

Based on 100 parts of polycondensate, preferably from 0.01 to 5 parts, particularly preferably from 0.02 to 2 parts and, in particular, from 0.05 to 1 part of a secondary aromatic amine are employed.

Difunctional epoxides in the context of this invention can have an aliphatic, aromatic, cycloaliphatic, araliphatic or heterocydic structure; they induce epoxide groups as side groups or these groups form part of an alicyclic or heterocydic ring system. The epoxide groups are preferably attached as glycidyl groups to the remainder of the molecule by way of ether or ester linkages, or the compounds are N-glycidyl derivatives of heterocyclic amines, amides or imides. Epoxides of these types are generally known and commercially available.

The epoxides contain two epoxide radicals, for example those of the formula V

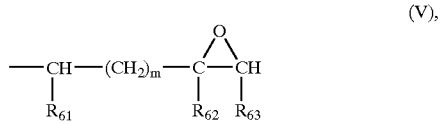

which are attached directly to carbon, oxygen, nitrogen or sulfur atoms and in which $R_{61}$ and $R_{63}$ are both hydrogen, $R_{62}$ is hydrogen or methyl and m is 0; or in which $R_{61}$ and $R_{63}$ together are —$CH_2CH_2$— or —$CH_2CH_2CH_2$—, $R_{62}$ is then hydrogen and m is 0 or 1.

EXAMPLES OF EPOXIDES ARE

1. Diglycidyl and di(β-methylglycidyl) esters obtainable by reacting a compound with two carboxyl groups in the molecule and epichlorohydrin and/or glycerol dichlorohydrin and/or β-methylepichlorohydrin. The reaction is expediently carried out in the presence of bases.

As compounds of two carboxyl groups in the molecule, aliphatic dicarboxylic acids can be used. Examples of these dicarboxylic acids are glutaric acid, adipic acid, pimelic acid, suboric acid, azelaic acid, sebacic acid or dimerized or trimerized linoleic acid.

It is however also possible to employ cycloaliphatic dicarboxylic acids such as, for example, tetrahydrophthalic acid, 4-methyltetrahydrophthalic acid, hexahydrophthalic acid or 4-methylhexahydrophthalic add.

Furthermore, aromatic dicarboxylic adds, for example phthalic acid or isophthalic add, can be used.

2. Diglycidyl or di(β-methylglycidyl) ethers obtainable by reacting a compound with two free alcoholic hydroxyl groups and/or phenolic hydroxyl groups and a suitably substituted epichlorohydrin under alkaline conditions, or in the presence of an acidic catalyst with subsequent alkali treatment.

Ethers of this type are derived, for example, from acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, sorbitol, and from polyepichlorohydrins.

However, they are also derived, for example, from cycloaliphatic alcohols such as 1,3- or 1,4-dihydroxycyclohexane, bis(4hydroxycyclohexyl)methane, 2,2-bis(4-hydroxycyclohexyl)-propane or 1,1-bis(hydroxymethyl)cyclohex-3-ene, or they possess aromatic nuclei, such as N,N-bis(2-hydroxyethyl)aniline or p,p'-bis(2-hydroxyethylamino)diphenylmethane.

The epoxides can also be derived from mononuclear phenols, such as, for example, from resorcinol, pyrocatechol or hydroquinone; or they are based on polynuclear phenols such as, for example, on 4,4'-dihydroxybiphenyl, bis(4-hydroxphenyl)methane, 2,2-bis(4-hydroxyphenyl)propane, 2,2-bis(3,5-dibromo-4-hydroxyphenyl)propane, 4,4'-dihydroxydiphenylsulfone, 9,9'-bis(4-hydroxyphenyl)fluorene, or on condensation products of phenols with formaldehyde that are obtained under acidic conditions, such as phenol novolaks.

3. Di-(N-glycidyl) compounds are obtainable, for example, by dehydrochlorination of the reaction products of epichlorohydrin with amines containing two amino hydrogen atoms. Examples of these amines are aniline, toluidine, n-butylamine, bis(4-aminophenyl)methane, m-xylylenediamine or bis(4-methylaminophenyl)methane.

Also included among the di(N-glycidyl) compounds, however, are N,N'-diglyddyl derivatives of cycloalkyleneureas, such as ethyleneurea or 1,3-propyleneurea, and N,N'-diglycidyl derivatives of hydantoins such as of 5,5-dimethylhydantoin.

4. Di(S-glycidyl) compounds, such as di-S-glycidyl derivatives derived from dithiols, such as, for example, ethane-1,2-dithiol or bis(4-mercaptomethylphenyl)ether.

5. Epoxides with a radical of the formula V in which $R_{61}$ and $R_{63}$ together are —$CH_2CH_2$— and m is 0 are, for example, bis(2,3-epoxycyclopentyl)ether, 2,3-epoxycyclopentyl glycidyl ether or 1,2-bis(2,3-epoxycyclopentoxy)ethane; an example of epoxides with a radical of the formula V in which $R_{61}$ and $R_{63}$ together are —$CH_2CH_2$— and m is 1 is (3',4'-epoxy-6'-methylcyclohexyl)methyl 3,4-epoxy-6-methylcyclohexanecarboxylate.

Owing, for example, to their preparation process, the abovementioned difunctional epoxides may include small amounts of mono- or trifunctional fractions.

Predominanty, use is made of diglycidyl compounds having aromatic structures.

If desired, it is also possible to employ a mixture of epoxides of different structures.

On the other hand, tri- and polyfunctional epoxides can be added supplementarily in order, if desired, to obtain branching. Examples of such epoxides are:

a) liquid bisphenol A diglyddyl ethers, such as Araldit®GY 240, Araldit®GY 250, Araldit®GY 260, Araldit®GY 266, Araldit®GY 2600 or Araldit®MY 790;

b) solid bisphenol A diglycidyl ethers, such as Araldit®GT 6071, Araldit®GT 7071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609 or Araldit®GT 6610;

c) liquid bisphenol F diglycidyl ethers, such as Araldit®GY 281, Araldit®GY 282, Araldit®PY 302, or Araldit®PY 306;

d) solid polyglycidyl ethers of tetraphenylethane, such as CG Epoxy Resin®0163;

e) solid and liquid polyglycidyl ethers of phenol-formaldehyde novolak such as EPN 1138, EPN 1139, GY 1180, PY 307;

f) solid and liquid polyglycidyl ethers of o-cresol-tormaldehyde novolak, such as ECN 1235, ECN 1273, ECN 1280, ECN 1299;

g) liquid glycidyl ethers of alcohols, such as Shell®Glycidylether 162, Araldit®DY 0390 or Araldit®DY 0391;

h) liquid glycidyl esters of carboxylic acids, such as Shell®Cardura E terephthalic ester, trimellitic ester. Araldit®PY 284 or mixtures of aromatic glycidyl esters, for example Araldit®PT 910;

i) solid heterocyclic epoxy resins (triglycidyl isocyanurate) such as Araldit®PT 810;

j) liquid cycloaliphatc epoxy resins such as Araldit®CY 179.

k) liquid N,N,O-triglycidyl ethers of p-aminophenol, such as Araldit®MY 0510;

l) tetraglycidyl-4—4'-methylenebenzamine or N,N,N',N'-tetraglycidyldiaminophenylmethane, such as Araldit®MY 720, Araldit®MY 721.

Particularly preferred difunctional epoxides are diglycidyl ethers based on bisphenols such as, for example, on 2,2-bis(4hydroxyphenyl)propane (bisphenol A), bis(4-hydroxyphenyl)-sulfone (bisphenol S) or mixtures of bis(ortho/para-hydroxyphenyl)methane (bisphenol F).

Very particular preference is given to epoxides of the bisphenol A diglycidyl ether type, for example: Araldit®GT 6071, GT 7071, GT 7072, GT 6097 and GT 6099 or epoxides of the bisphenol F type, such as Araldit®GY 281 or PY 306. Of very special interest is an epoxide of the bisphenol A diglycidyl ether type, such as Araldit®T 6071, for example.

Based on 100 parts of polycondensate, preferably from 0.01 to 5 parts, particularly preferably from 0.02 to 2 parts and, in particular from 0.05 to 1 part of a difunctional epoxide are employed.

The process can be carried out in any vessels which can be heated and are fitted with a stirring device. These may, for example, be closed apparatus from which atmospheric oxygen is excluded, working for example under an inert gas atmosphere such as nitrogen, or else with vacuum degassing. The process is preferably conducted in an extruder.

The polycondensate that is to be heated and the novel additives are usually charged to the apparatus at the beginning of heating; however, subsequent metered addition of the novel additives to the polycondensate is also possible, it being possible for the mixture of the additives or else the individual components to be added in any desired sequence. Heating at above the melting point or glass transition point is generally carried out until the novel additives are homogeneously distributed. Homogeneous distribution can take place, for example, by means of stirring or kneading in an extruder. The temperature here depends on the polycondensate used. In the case of crystalline polycondensates, it is preferred to operate in the range between melting point and a temperature about 50° C. above the melting point. In the case of amorphous polycondensates, the process is expediently carried out, for instance, In the region of 50° C. and 150° C. above the respective glass transition temperature.

For their addition, the novel additives can independently of one another be present in the form of a liquid, powder or granules, or in compacted form, or else on a substrate material, such as silica gel, together with a polymer powder or wax, for example a polyethylene wax, or as a concentrate, for example in a masterbatch.

The amount of additives depends on the initial molecular weight of the polycondensate and on the desired final molecular weight.

The novel process has the advantage that the increase in molecular weight and/or viscosity takes place within short reaction times, and the additives can be added in solid form. The novel process also has the advantage that the polycondensate undergoes no additional discoloration. The combination of (i) aromatic dicyanates with (ii) polyfunctional compounds selected from the class of the sterically hindered hydroxyphenyl-alkyl-phosphonic esters and monoesters, diphosphites and secondary aromatic amines leads synergistically to the build-up of the molecular weight of virgin polycondensate or polycondensate recyclate, with retention of the linear chain structure.

In addition to the additives described above, stabilizers can be added to the polycondensate. These stabilizers are generally known to the skilled worker and are chosen depending on the specific requirements regarding the end product. In particular it is possible to add light stabilizers or else antioxidants (R. Gächter, H. Müller, Hanser Verlag, "Plastics Additives Handbook, 3rd Ed.," especially pages 82 to 85 and 255 to 258 (1990)). Among these, those which may be mentioned as particularly suitable are:

1. antioxidants 1.1. Esters of β-(3,5-di-tert-butyl4-hydroxphenyl) propionic acid with mono- or polyhydric alcohols, e.g, with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.2. Esters of β-(5-tert-butyl-4-hydroxy-3-methylphenyl) propionic acid with mono- or polyhydric alcohols, e.g. with methanol, ethanol, noctanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicydo[2.2.2]octane.

1.3. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicydo[2.2.2]octane.

1.4. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.5. Amides of β-(3,5-di-tert-butyl-4-hydroxyphenyl) propionic acid e.g. N,N'-bis(3,5-di-tertbutyl-4- hydroxyphenylpropionyl)hexamethylenediamide, N,N'-bis (3,5di-tert-butyl-4-hydroxyphenylpropionyl) trimethylenediamide, N,N'-bis(3,5-di-tert-butyl4-hydroxyphenylpropionyl)-hydrazide, N,N'-bis[2-(3-[3,5-di-tert-butyl-4hydroxyphenyl]propionyloxy)ethyl]oxamide (Naugard®XL-1 supplied by Uniroyal).

1.6. Tocopherols, for example α-tocopherol, β-tocopherol, γ-tocopherol, δ-tocopherol and mixtures thereof (vitamin E).

Among these, preferred antioxidants are those of the type Irganox®1098 (N,N'-bis(3,5-di-tert-butyl-4-hydroxyphenylpropionyl)hexamethylenediamine) or Irganox®245 (ester of 3,5-di-tert-butyl-4-hydroxyphenyl acetic acid with triethylene glycol), preferably in combination with aromatic phosphites or phosphonites (see item 3).

2. UV Absorbers and Light Stabilisers 2.1. 2-(2'-Hydroxyohenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy4'-octyloxyphenyl)benzotriazole, 2-(3',5'-di-tert-amyl-2'-hydroxyphenyl)benzotriazole, 2-(3',5'bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]2H-benzotriazole with polyethylene glycol 300; [R—CH$_2$CH$_2$—COO—CH$_2$CH$_2$—]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzy)-phenyl]benzotriazole.

2.2.2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of Substituted and Unsubstituted Benzoic Acids, as for example 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,βdiphenylacrylate, methyl α-carbomethoxycinnamate, methyl α-cyano-β-methyl-p-methoxy-cinnamate, butyl α-cyano-βmethyl-p-methoxy-cinnamate, methyl α-carbomethoxy-p-methoxycinnamate and N-(β-carbomethoxy-β-cyanovinyl)-2-methylindoline.

2.5. Nickel Compounds, for example nickel complexes of 2,2'-thio-bis-[4-(1,3,3-tetramethylbutyl)phenol], such as the 1:1 or 1:2 complex, with or without additional ligands such as n-butylamine, triethanolarmine or N-cyclohexyldiethanolamine, nickel dibutyldithiocarbamate, nickel salts of the monoalkyl esters, e.g, the methyl or ethyl ester, of 4-hydroxy-3,5-di-tert-butylbenzylphosphonic acid, nickel complexes of ketoximes, e.g, of 2-hydroxy-4-methylphenyl undecylketoxime, nickel complexes of 1phenyl-4-lauroyl-5-hydroxypyrazole, with or without additional ligands.

2.6. Sterically Hindered Amines, for example bis(2,2,6,6-tetramethyl-4-piperidyl)sebacate. bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis-(2,2,6,6-tetramethyl-4-piperidyl)-1,2,3,4-butane-tetracarboxylate, 1,1'-(1,2-ethanediyl)-bis-(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethpiperidyfoxycarbonyl)-2-(4-methoxyphenyl) ethene, N,N'-bis-formyl-N,N'-bis(2,2,6,6-tetramethyl-4-piperidyl)hexamethylenediamine, diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8.2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl-3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Phosphites and Phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl)ethyl phosphite, 2,2',2''-nitrilo[triethyltris(3,3',5,5'-tetra-tert-butyl-1,1'-biphenyl-2,2'-diyl)phosphite], 2-ethylhexyl(3,3',5,5'-tetra-tertutyl-1,1'-biphenyl-2,2'-diyl)phosphite.

Especially Preferred are the Following Phosphites:

Tris(2,4-di-tert-butylphenyl) phosphite (Irgafos®168, Ciba-Geigy), tris(nonylphenyl) phosphite,

(A)

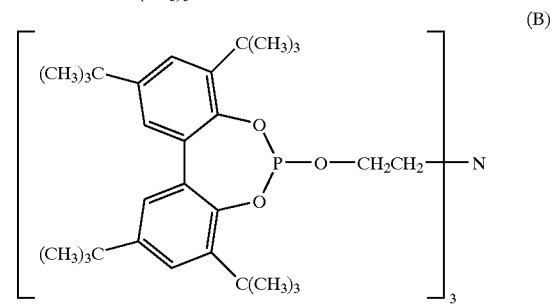

(B)

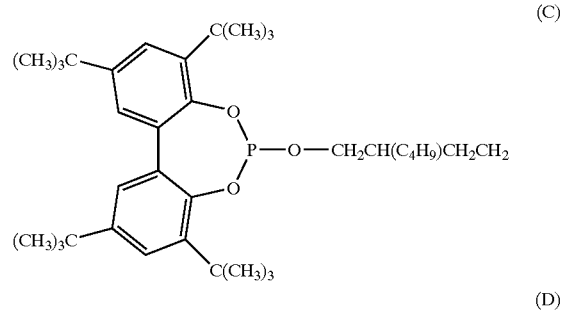

(C)

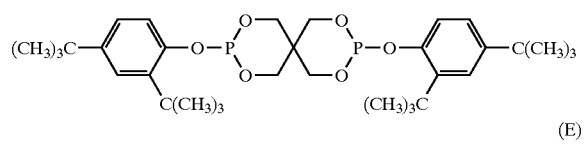

(D)

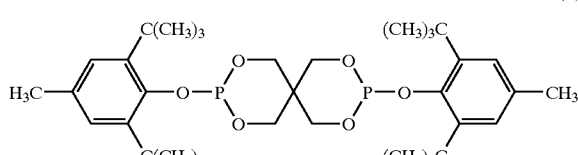

(E)

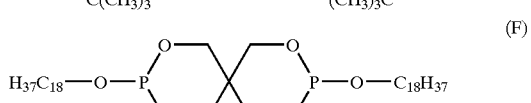

(F)

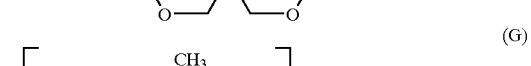

(G)

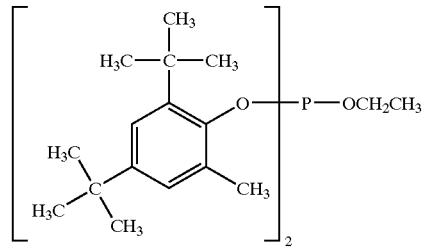

Very particular preference is given to tris(2,4-di-tert-butylphenyl) phosphite [Irgafos®168, Ciba-Geigy], bis(2,4-di-tert-butyl-6-methylphenyl)ethyl phosphite [Irgafos®38, Ciba-Geigy, formula (G)] and 2,2',2''-nitrilo[triethyl tris(3, 3',5,5'-tetra-tert-butyl-1,1'-biphenyl-2,2'-diyl) phosphite [Irgafos®12, Ciba-Geigy, formula (B)].

4. Polyamide Stabilisers, for example, copper salts in combination with jodides anchor phosphorus compounds and salts of divalent manganese.

5. Fillers and Reinforcing Agents, for example, calcium carbonate, silicates, glass fibers, glass bulbs, asbestos, talc, kaolin, mica, barium sulfate, metal oxides and hydroxides, carbon black, graphite, wood flour and flours or fibers of other natural products, synthetic fibers.

6. Other Additives, for example, plasticisers, lubricants, emulsifiers, pigments, rheology additives, catalysts, flow-control agents, optical brighteners, flameproofing agents, antistatic agents and blowing agents.

The additional additives and/or stabilizers are added to the polycondensate in concentrations, for example, of from 0.01 to 10%, based on the overall weight of the polycondensate.

Among such additions, preference is given to light stabilizers from classes 2.1, 2.6 and 2.7, for example light stabilizers of the type Chimassorb®944, Chimassorb®19, Tinuvin®34, Tinuvine®312, Tinuvin®8622 or Tinuvin®770. Preference is also given to aromatic phosphites or phosphonites.

Where the polycondensate is a recyclate, it can also be employed mixed with virgin material or together with virgin material, for example in a coextrusion process.

The invention additionally provides for the use of an aromatic dicyanate for increasing the molecular weight and/or viscosity of virgin polycondensate or polycondensate recyclate.

The invention also provides for the use of a mixture comprising an aromatic dicyanate and, in addition, at least one polyfunctional compound selected from the class of the sterically hindered hydroxyphenyl-alkyl-phosphonic esters and monoesters, diphosphonites and secondary aromatic amines for increasing the molecular weight and/or viscosity of virgin polycondensate or polycondensate recyclate.

The present invention also provides for the use of a mixture comprising (i) an aromatic dicyanate, (ii) at least one polyfunctional compound selected from the class of sterically hindered hydroxyphenyl-alkyl-phosphonic esters and monoesters, diphosphonites and secondary aromatic amines, and (iii) a difunctional epoxide for increasing the molecular weight and/or viscosity of virgin polycondensate or polycondensate recyclate.

The preferences regarding the use correspond to those for the process.

The invention provides, furthermore, a composition comprising (a) a virgin polycondensate or polycondensate recyclate or a mixture thereof, and (b) an aromatic dicyanate.

The Invention additionally provides a composition comprising (a) a virgin polycondensate or polycondensate recyclate or a mixture thereof, (b) an aromatic dicyanate, and (c) at least one polyfunctional compound selected from the class of the sterically hindered hydroxyphenyl-alkyl-phosphonic esters and monoesters, diphosphonites and secondary aromatic amines.

The present invention additionally provides a composition comprising (a) a virgin polycondensate or polycondensate recyclate or a mixture thereof, (b) an aromatic dicyanate, (c) at least one polyfunctional compound selected from the class of the statically hindered hydroxyphenyl-alkyl-phosphonic esters and monoesters, diphosphonites and secondary aromatic amines, and (d) a difunctional epoxide.

The preferences regarding the compositions correspond to those for the process.

The invention further provides, in addition, polycondensates obtainable by the novel process.

The examples which follow illustrate the invention in more detail without limiting it thereto. As in the rest of the description, parts and percentages are by weight unless stated otherwise.

EXAMPLE 1

Increasing the Molecular Weight and/or Viscosity of Polyamide 6

In a Plasticorder from Brabender with a W 50 mixing chamber, a polyamide 6 (Durethan®B30 S from Bayer) is processed under nitrogen at a temperature of 235° C. and at 40 revolutions/minute with the additives indicated in Table 1. The torque of the polyamide is determined after 6 and 15 minutes. The larger the number, the higher the molecular weight. After 15 minutes the melt index (MFR) is measured (at 235° C. under 2.16 kg in accordance with ISO 1133). A large increase in the melt index denotes severe chain degradation, and thus a reduction In molecular weight The results are compiled in Table 1.

TABLE 1

| | | Torque [Nm] after | | |
|---|---|---|---|---|
| Example | Additives | 6 min. | 15 min. | Melt index |
| 1a[g] | — | 3.4 | 3.4 | 43.7 |
| 1b[g] | 0.50% Araldit ® GT 6071[a] | 4.7 | 4.9 | 23.8 |
| 1c | 0.25% BPC[b] | 5.4 | 5.0 | 22.5 |
| 1d | 0.50% BPC[b] | 6.1 | 5.3 | 17.5 |
| 1e | 0.75% BPC[b] | 7.2 | 7.1 | 14.3 |
| 1f | 1.00% BPC[b] | 8.3 | 7.7 | 12.2 |
| 1g | 0.50% BPC[b] 0.50% Irganox ® 1222[c] | 7.8 | 7.8 | 12.0 |
| 1h | 1.00% BPC[b] 1.00% Irganox ® 1425[d] | 10.4 | 10.5 | 7.8 |
| 1i | 1.00% BPC[b] 0.50% Irgafos ® PEPQ[e] | 9.2 | 8.0 | 11.1 |
| 1k | 0.50% BPC[b] 0.50% Irganox ® 5057[f] | 6.6 | 6.8 | 12.1 |
| 1l | 1.00% BPC[b] 0.50% Irganox ® 5057[f] | 11.0 | 10.0 | 7.7 |
| 1m | 0.50% BPC[b] 0.50% Irganox ® 1222[c] | 9.4 | 10.1 | 7.5 |

TABLE 1-continued

| | | Torque [Nm] after | | |
| Example | Additives | 6 min. | 15 min. | Melt index |
|---|---|---|---|---|
| | 0.50% Araldit ® GT 6071[a)] | | | |

[a)]Araldit ® GT 6071 (Ciba-Geigy) is bisphenol A diglycidyl ether with an epoxide number of 2.15–2.22 eq/kg and a softening range of 70–75° C.
[b)]BPC is bisphenol A dicyanate and is a compound of the formula Ia

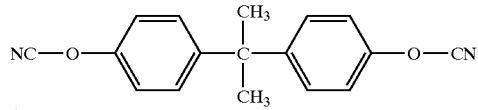
(Ia)

[c)]Irganox ® 1222 (Ciba-Geigy) is a compound of the formula IIa

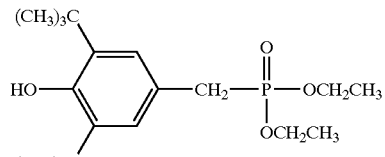
(IIa)

[d)]Irganox ® 1425 (Ciba-Geigy) is a compound of the formula IIb

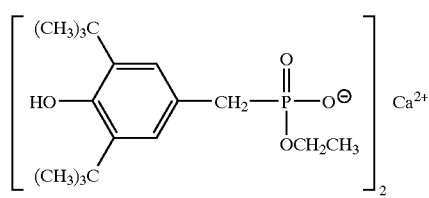
(IIb)

[e)]Irgafos ® PEPQ (Ciba-Geigy) is a compound of the formula IIIa

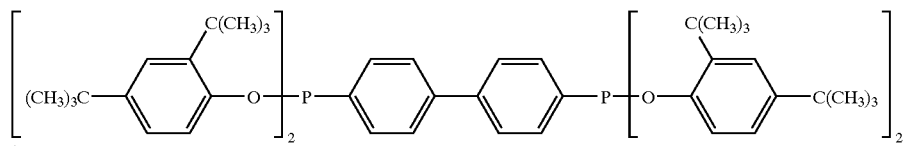
(IIIa)

[f)]Irganox ® 5057 (Ciba-Geigy) is 4,4'-di-tert-octyldiphenylamine and is a compound of the formula IVe (IVe)

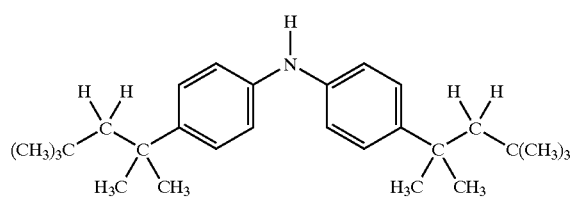

[g)]Comparison examples

EXAMPLE 2

Increase in Molecular Weight and/or Viscosity of Polyamide 6.6

In a TW 200 twin-screw extruder from Haake, a polyamide 6.6 (Durethan®A 30 S from Bayer) is processed at a temperature of 290° C. and 40 revolutions/minute with the additives indicated in Table 2. After 15 minutes the melt index (MFR) is measured (at 275° C. under 2.16 kg in accordance with ISO 1133). A large increase in the melt index denotes severe chain degradation and thus a reduction In molecular weight, and a large decrease in the melt index denotes an increase in molecular weight. The results are compiled in Table 2.

TABLE 2

| Example | Additives | Melt index [g/10 min] |
|---|---|---|
| 2a[d)] | — | 63.0 |
| 2b | 0.50% AroCy ® B-10[a)] | 36.0 |
| 2c | 0.50% AroCy ® L-10[b)] | 22.0 |
| 2d | 0.50% AroCy ® B-10[a)] 0.25% Irganox ® 1425[c)] | 30.0 |

[a)]AroCy ® B-10 (Rhone-Poulenc) is a compound of formula Ia (Ia)

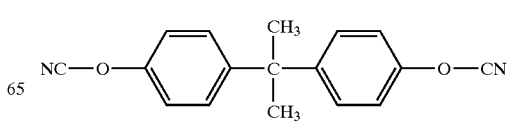

TABLE 2-continued

| Example | Additives | Melt index [g/10 min] |
|---|---|---| b)AroCy ® L-10 (Rhone-Poulenc) is a compound of formula Id

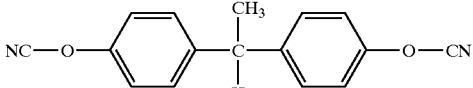
(Id)

c)Irganox ® 1425 (Ciba-Geigy) is a comound of formula IIb

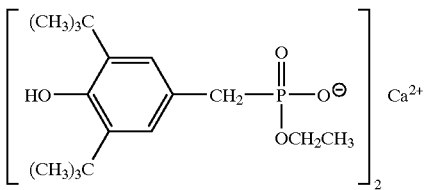
(IIb)

d)Comparison example.

What is claimed is:

1. A process for increasing the molecular weight and/or viscosity of a polyester or a copolyester, which process comprises heating in a mixer or extruder a polyester or a copolyester to the melting point or up to 50° C. above the melting point or 50° C. to 150° C. above the glass transition point of the polyester or copolyester, with the addition of at least one aromatic dicyanate and at least one further compound selected from the group consisting of the sterically hindered hydroxyphenyl-alkyl-phosphonic esters or monoesters, and secondary aromatic amines, wherein the polyester or copolyester remains in the thermoplastic state after the process.

2. A process according to claim 1, wherein at least one difunctional epoxide is additionally employed.

3. A process according to claim 2, wherein the difunctional epoxide is a compound which contains epoxide radicals of the formula V

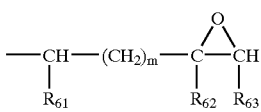
(V)

which are attached directly to carbon, oxygen, nitrogen or sulfur atoms and in which $R_{61}$ and $R_{63}$ are both hydrogen, $R_{62}$ is hydrogen or methyl and m is 0; or in which $R_{61}$ and $R_{63}$ together are —CH$_2$CH$_2$— or —CH$_2$CH$_2$CH$_2$—, $R_{62}$ is then hydrogen and m is 0 or 1.

4. A process according to claim 2, wherein the difunctional epoxide is an epoxide of bisphenol A diglycidyl ether or bisphenol F diglycidyl ethers.

5. A process according to claim 2, wherein from 0.01 to 5 parts by weight of the difunctional epoxide are employed per 100 parts by weight of the polyester or copolyester.

6. A process according to claim 1, wherein the polyester or copolyester is a recyclate.

7. A process according to claim 1, wherein the aromatic dicyanate is a compound of the formula I

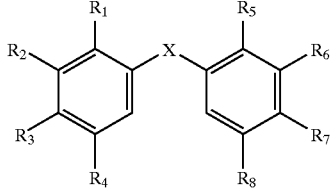
(I)

in which
X is a direct bond, oxygen, sulfur, —SO—, —SO$_2$—,

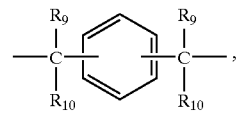

$C_2$–$C_{18}$alkylene, $C_2$–$C_{18}$alkenylene or

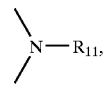

$R_1$, $R_2$, $R_3$ and $R_4$ independently of one another are hydrogen, $C_1$–$C_{25}$alkyl, $C_5$–$C_{12}$cycloalkyl, unsubstituted or $C_1$–$C_4$alkyl-substituted phenyl; $C_7$–$C_9$phenylalkyl, hydroxyl, $C_1$–$C_{25}$alkoxy or —O—CN, with the proviso that at least one of the radicals $R_1$, $R_2$, $R_3$ and $R_4$ is —O—CN, $R_5$, $R_6$, $R_7$ and $R_8$ independently of one another are hydrogen, $C_1$–$C_{25}$alkyl, $C_5$–$C_{12}$cycloalkyl, unsubstituted or $C_1$–$C_4$alkyl-substituted phenyl; $C_7$–$C_9$phenylalkyl, hydroxyl, $C_1$–$C_{25}$alkoxy or —O—CN, with the proviso that at least one of the radicals $R_5$, $R_6$, $R_7$ and $R_8$ is —O—CN, $R_9$ and $R_{10}$ independently of one another are hydrogen, $C_1$–$C_{12}$alkyl, trifluoromethyl or phenyl, or $R_9$ and $R_{10}$, together with the carbon atom to which they are attached, form a $C_5$–$C_8$cycloalkylidene ring which is unsubstituted or is substituted by 1 to 3 $C_1$–$C_4$alkyls; and $R_{11}$ is hydrogen or $C_1$–$C_{12}$alkyl.

8. A process according to claim 7, wherein
X is a direct bond, oxygen,

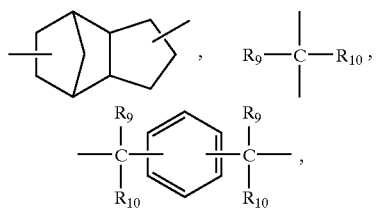

$C_2$–$C_{12}$alkylene or $C_2$–$C_{12}$alkenylene,
$R_1$, $R_2$, $R_3$ and $R_4$ independently of one another are hydrogen, $C_1$–$C_{18}$alkyl, $C_5$–$C_8$cycloalky), phenyl, benzyl, $C_{1-C18}$alkoxy or —O—CN, with the proviso that at least one of the radicals $R_1$, $R_2$, $R_3$ or $R_4$ is —O—CN, $R_5$, $R_6$, $R_7$ and $R_8$ independently of one another are hydrogen, $C_1$–$C_{18}$alkyl, $C_5$–$C_8$cycloalkyl, phenyl, benzyl, $C_1$–$C_{18}$alkoxy or —O—CN, with the proviso that at least one of the radicals $R_5$, $R_6$, $R_7$ or $R_8$ is —O—CN, and $R_9$ and $R_{10}$ independently of one another are hydrogen, $C_1$–$C_8$alkyl, trifluoromethyl or phenyl, or $R_9$ and $R_{10}$, together with the carbon atom to which they are attached, form a $C_5$–$C_6$cyclo-alkylidene ring.

9. A process according to claim 7, wherein $R_1$ and $R_5$ are hydrogen, $R_2$, $R_4$, $R_6$ and $R_8$ are hydrogen or methyl, and $R_3$ and $R_7$ are —O—CN.

10. A process according to claim 7, wherein

X is a direct bond,

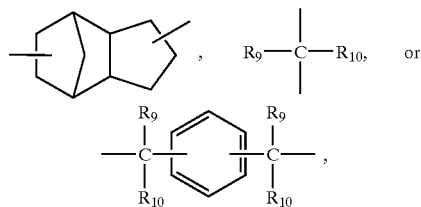

$R_1$ is hydrogen, $R_2$ is hydrogen or $C_1$–$C_4$alkyl, $R_3$ is —O—CN, $R_4$ is hydrogen or $C_1$–$C_4$alkyl, $R_5$ is hydrogen, $R_6$ is hydrogen or $C_1$–$C_4$alkyl, $R_7$ is —O—CN, $R_8$ is hydrogen or $C_1$–$C_4$alkyl, and $R_9$ and $R_{10}$ independently of one another are hydrogen, methyl or trifluoromethyl.

11. A process according to claim 7, wherein

X is 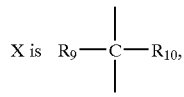

$R_1$ and $R_2$ are hydrogen, $R_3$ is —O—CN, $R_4$, $R_5$ and $R_6$ are hydrogen, $R_7$ is —O—CN, $R_8$ is hydrogen, and $R_9$ and $R_{10}$ independently of one another are hydrogen or methyl.

12. A process according to claim 1, wherein the further compound is a sterically hindered hydroxyphenyl-alkyl-phosphonic ester or monoester of the formula II

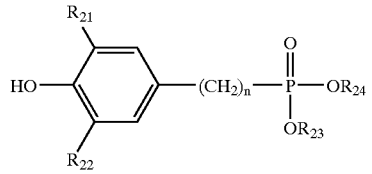

in which $R_{21}$ is isopropyl, tert-butyl, cyclohexyl or cyclohexyl which is substituted by 1 to 3 $C_1$–$C_4$alkyl groups, $R_{22}$ is hydrogen, $C_1$–$C_4$alkyl, cyclohexyl or cyclohexyl which is substituted by 1 to 3 $C_1$–$C_4$alkyl groups, $R_{23}$ is $C_1$–$C_{20}$alkyl, or unsubstituted or $C_1$–$C_4$alkyl-substituted phenyl or naphthyl, $R_{24}$ is hydrogen, $C_1$–$C_{20}$alkyl, unsubstituted or $C_1$–$C_4$alkyl-substituted phenyl or naphthyl; or is

$M^{r+}$ is an r-valent metal cation, n is 1, 2, 3, 4, 5 or 6, and r is 1, 2 or 3.

13. A process according to claim 1, wherein the further compound is a sterically hindered hydroxyphenyl-alkyl-phosphonic ester or monoester of the formula IIa or IIb

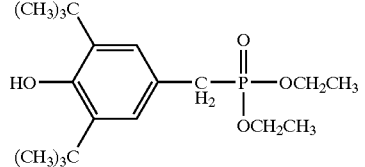

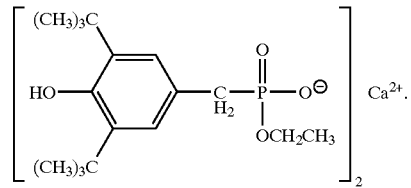

14. A process according to claim 1, wherein the further compound is a secondary aromatic amine of the formula IV

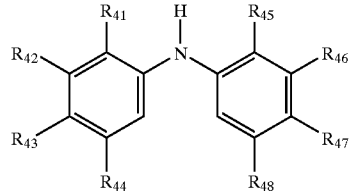

in which $R_{41}$ is hydrogen or $C_1$–$C_{25}$alkyl, $R_{42}$ is hydrogen, $C_1$–$C_{25}$alkyl or benzyl, $R_{43}$ is hydrogen, $C_1$–$C_{25}$alkyl, $C_5$–$C_{12}$cycloalkyl, benzyl, α-methylbenzyl or α,α-dimethylbenzyl; or $R_{42}$ and $R_{43}$ together form a divalent group

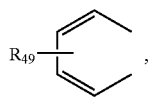

$R_{44}$ is hydrogen, $C_1$–$C_{25}$alkyl or benzyl, $R_{45}$ is hydrogen or $C_1$–$C_{25}$alkyl, $R_{46}$ is hydrogen, $C_1$–$C_{25}$alkyl or benzyl, $R_{47}$ is hydrogen, $C_1$–$C_{25}$alkyl, $C_5$–$C_{12}$cycloalkyl, benzyl, α-methylbenzyl, α,α-dimethylbenzyl or

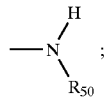

or $R_{46}$ and $R_{47}$ together form a divalent group

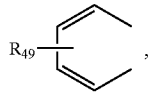

$R_{48}$ is hydrogen, $C_1$–$C_{25}$alkyl or benzyl, $R_{49}$ is hydrogen or $C_1$–$C_{25}$alkyl, and $R_{50}$ is $C_5$–$C_{12}$cycloalkyl.

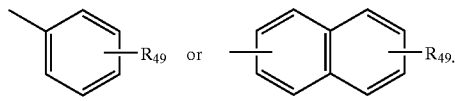

15. A process according to claim 1, wherein the further compound is a secondary aromatic amine of the formula IVe.

(IVe).

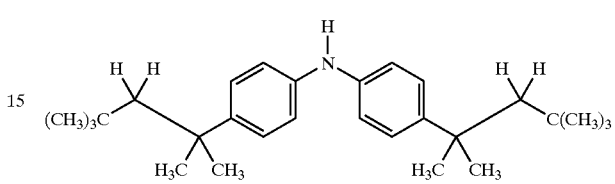

16. A process according to claim 1, wherein from 0.01 to 5 parts by weight of the aromatic dicyanate are employed per 100 parts by weight of the polyester or copolyester.

17. A process according to claim 1, wherein from 0.01 to 5 parts by weight of the compounds selected from the group consisting of the sterically hindered hydroxyphenyl-alkyl-phosphonic esters or monoesters, and secondary aromatic amines are employed per 100 parts by weight of the polyester or copolyester.

18. A process according to claim 1, wherein the polyester is a polyethylene terephthalate a corresponding recyclate or copolymer thereof.

19. A process according to claim 1, wherein the polyester is a polybutylene terephthalate/polycarbonate blend or a blend comprising predominantly polybutylene terephthalate/polycarbonate or a corresponding recyclate or a blend of a recyclate and a virgin polymer component.

* * * * *